(12) United States Patent  
Goodall et al.

(10) Patent No.: US 7,041,758 B2  
(45) Date of Patent: May 9, 2006

(54) CATALYST COMPLEXES FOR POLYMERIZATION AND CO-POLYMERIZATION OF CYCLIC OLEFINS

(75) Inventors: Brian L. Goodall, Ambler, PA (US); Lester Howard McIntosh, III, Green Lane, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 11/053,811

(22) Filed: Feb. 9, 2005

(65) Prior Publication Data

US 2005/0215735 A1  Sep. 29, 2005

Related U.S. Application Data

(60) Provisional application No. 60/556,755, filed on Mar. 26, 2004.

(51) Int. Cl.
*C08F 4/80* (2006.01)

(52) U.S. Cl. ............... 526/171; 526/120; 526/134; 526/281; 264/331.17

(58) Field of Classification Search .......... 526/171, 526/281, 120, 134; 264/331.17
See application file for complete search history.

(56) References Cited

U.S. PATENT DOCUMENTS

| 5,468,819 A | 11/1995 | Goodall et al. |
| 5,714,556 A | 2/1998 | Johnson et al. |
| 5,728,839 A | 3/1998 | Herrmann et al. |
| 5,866,663 A | 2/1999 | Brookhart et al. |
| 6,350,832 B1 | 2/2002 | Bell et al. |
| 6,455,650 B1 | 9/2002 | Lipian et al. |
| 6,538,087 B1 | 3/2003 | Zhao et al. |
| 6,544,919 B1 | 4/2003 | Tagge et al. |
| 6,613,851 B1 | 9/2003 | Jens et al. |
| 6,787,620 B1 * | 9/2004 | Herrmann et al. .......... 526/171 |
| 2002/0040115 A1 * | 4/2002 | Sen et al. .................. 526/171 |

OTHER PUBLICATIONS

Hennis, et al., "Novel,Efficient, Palladium-Based System for the Polymerization of Norbornene Derivatives:Scope and Mechanism,ORGANOMETALLICS",v.20, No. 13, pp. 2802-2812 (2001).

Sun, et al., "Vinyl Polymerization fo Norbornene with Neutral Salicylaldiminato Nickel (II) Complexes", ORGANOMETALLICS, v.22, No. 18, pp. 3678-3683 (2003).

Lassahn, et al.Homo-and heterometallic carboxylate cage complexes as precatalysts for olefin polymerization—Activity enhancement through "inert metals",Journal of Catalysis.

Wolfgang A. Herrmann, N-Heterocyclic Carbenes: A New Concept In Organometallic Catalysis, Angew. Chem. Int. Ed., v. 41, pp. 1290-1309 (2002).

* cited by examiner

*Primary Examiner*—Fred Teskin
(74) *Attorney, Agent, or Firm*—Thomas S. Deibert

(57) ABSTRACT

A process for polymerizing and copolymerizing cyclic olefins, such as, norbornene is disclosed. The disclosed process uses a catalyst complex that exhibit a high activity for the polymerization and co-polymerization of cyclic olefins and improved stability toward heat, oxygen and moisture.

17 Claims, No Drawings

US 7,041,758 B2

CATALYST COMPLEXES FOR POLYMERIZATION AND CO-POLYMERIZATION OF CYCLIC OLEFINS

CROSS REFERENCE TO RELATED PATENT APPLICATIONS

This is a non-provisional application of prior pending U.S. provisional application Ser. No. 60/556,755 filed Mar. 26, 2004.

The present invention relates to catalyst complexes that facilitate the polymerization and co-polymerization of cyclic olefins. The present invention also relates to a method of making the catalyst complexes and to a method of using the catalyst complexes.

Polymers and copolymers of cyclic olefins exhibit desirable optical properties (e.g., wide spectral window, inherently low birefringence and deep UV transparency), excellent electrical properties (low dielectric constant, low dielectric loss, high breakdown voltage and low moisture absorption) and various other desirable properties such as high reactive ion etch (RIE) resistance, high glass transition temperatures, toughness, tailorable adhesion (e.g., to metals and metal oxides) and solubility behavior.

One class of catalysts for the polymerization and co-polymerization of cyclic olefins is disclosed in U.S. Pat. No. 6,538,087 to Zhao et al. Zhao disclose a catalyst according to the formula:

$$[R'_z ML'_x L''_y]_b [WCA]_d$$

wherein M is a Group 10 transition metal; R' is an anionic hydrocarbyl ligand; L' is a Group 15 neutral donor ligand; L" is a labile neutral electron donor ligand and WCA is a weakly cordination counteranion; wherein x is 1 or 2; y is 0, 1, 2 or 3 and the sum of x, y and z is 4 and wherein b and d are selected to balance the electronic charge between the cation complex and the weakly coordinating counteranion.

Nevertheless, there remains a need for new catalyst complexes useful for facilitating the polymerization and co-polymerization of cyclic olefins. Note that Group 15 donor ligands may exhibit a tendency to dissociate from their transition metal centers. Such dissociation can result in catalyst deactivation or loss of selectivity. We have now found that catalyst complexes containing N-heterocyclic carbene ligands exhibit high activity for the facilitation of the polymerization and co-polymerization of cyclic olefins and exhibit improved stability toward heat, oxygen and moisture.

In one aspect of the present invention, there is provided a process for preparing a polycyclic polymer comprising contacting at least one polycyclicolefin monomer with a catalyst complex having a formula (i):

$$[L:MR]_b[WCA]_d \qquad (i)$$

wherein [L:MR] is a cation complex where R represents a hydrocarbyl group; M represents a metal selected from Ni, Pd and Pt; L: represents an N-heterocyclic carbene ligand and [WCA] represents a weakly coordinating anion, with the proviso that [WCA] is not $BF_4^-$; and b and d are integers representing the number of times the cation complex and the weakly coordinating counteranion are taken to balance the electronic charge on the overall catalyst complex.

In another aspect of the present invention, there is provided a reaction injection molding process for forming a polymeric article comprising combining at least two reactant streams to form a reactive monomer composition and, optionally, transfering the reactive monomer composition to a mold where polymerization proceeds; wherein at least one of the at least two reactant streams contains a catalyst precursor [L:MRX] and a carrier; wherein at least one of the at least two reactant streams contains the salt of a weakly coordinating anion $[N^+ WCA^-]$ and a carrier; wherein the carrier liquid may be a solvent for the catalyst system component or a monomer or mixture of monomers to be polymerized; wherein at least one of the at least two reactant streams must comprise a polycycloolefin monomer to be polymerized; with the proviso that the catalyst precursor, [L:MRX], and the salt of a weakly coordinating anion, $[N^+ WCA^-]$, are not contained in the same one of the at least two reactant streams; and wherein the catalyst precursor [L:MRX] comprises a N-heterocyclic carbene ligand, L:.

Hydrocarbyl groups, R, suitable for use with the present invention include, for example, hydrogen, linear and branched $C_1$–$C_{20}$ alkyl, $C_5$–$C_{10}$ cycloalkyl, linear and branched $C_2$–$C_{20}$ alkenyl, $C_6$–$C_{15}$ cycloalkenyl, allylic ligands or canonical forms thereof, $C_6$–$C_{30}$ aryl, $C_6$–$C_{30}$ heteroatom containing aryl and $C_7$–$C_{30}$ aralkyl; each of the foregoing groups can optionally be substituted with hydrocarbyl and/or heteroatom substituents selected from linear or branched $C_1$–$C_5$ alkyl, linear or branched $C_1$–$C_5$ haloalkyl, linear or branched $C_2$–$C_5$ alkenyl and haloalkenyl, halogen, sulfur, oxygen, nitrogen, phosphorus, and phenyl optionally substituted with linear or branched $C_1$–$C_5$ alkyl, linear or branched $C_1$–$C_5$ haloalkyl, and halogen; wherein the cycloalkyl and cycloalkenyl groups may be monocyclic or multicyclic; wherein the aryl groups can be a single ring (e.g., phenyl) or a fused ring system (e.g., naphthyl); wherein the cycloalkyl, cycloalkenyl and aryl groups can be taken together to form a fused ring system; and wherein each of the monocyclic, multicyclic and aryl ring systems may optionally be monosubstituted or multisubstituted with a substituent independently selected from hydrogen, linear and branched $C_1$–$C_5$ alkyl, linear and branched $C_1$–$C_5$ haloalkyl, linear and branched $C_1$–$C_5$ alkoxy, chlorine, fluorine, iodine, bromine, $C_5$–$C_{10}$ cycloalkyl, $C_6$–$C_{15}$ cycloalkenyl and $C_6$–$C_{30}$ aryl.

In one aspect, R may be selected from the group of structures depicted in Structures A-E bound to a metal center M or a metal center with a ligand M(L).

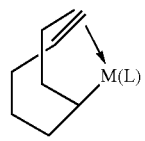

Structure A

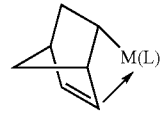

Structure B

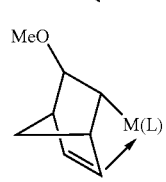

Structure C

-continued

Structure D

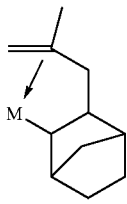

Structure E

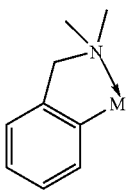

Metals, M, suitable for use with the present invention include, for example, nickel (Ni), palladium (Pd) and platinum (Pt). In one embodiment, the metal, M, is selected from Ni, Pd and Pt. In another embodiment, the metal, M, is selected from Ni and Pd. In yet another embodiment, the metal, M, is palladium.

N-heterocyclic carbene ligands, L:, suitable for use with the present invention include saturated and unsaturated substituted and unsubstituted imidazolidine having a structure according to one of (I)–(IV)

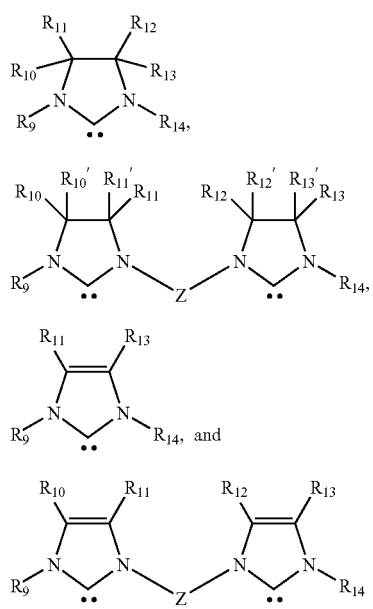

wherein $R_9$, $R_{10}$, $R_{10}'$, $R_{11}$, $R_{11}'$, $R_{12}$, $R_{12}'$, $R_{13}$, $R_{13}'$ and $R_{14}$ are each independently a hydrogen or a substituted or unsubstituted substituent selected from $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl, $C_1$–$C_{20}$ alkylsulfinyl, and silyl; and bridging moiety Z may be selected from $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl, $C_1$–$C_{20}$ alkylsulfinyl, and silyl.

In one aspect, at least one of the $R_9$, $R_{10}$, $R_{10}'$, $R_{11}$, $R_{11}'$, $R_{12}$, $R_{12}'$, $R_{13}$, $R_{13}'$ and $R_{14}$ substituent groups is substituted with at least one moiety selected from $C_1$–$C_{10}$ alkyl, $C_1$–$C_{10}$ alkoxy, and aryl which in turn may each be further substituted with at least one group selected from a halogen, a $C_1$–$C_5$ alkyl, $C_1$–$C_5$ alkoxy and phenyl.

In another aspect, at least one of the $R_9$, $R_{10}$, $R_{10}'$, $R_{11}$, $R_{11}'$, $R_{12}$, $R_{12}'$, $R_{13}$, $R_{13}'$ and $R_{14}$ substituent groups further includes at least one functional group. Functional groups suitable for use in these substituent groups include, for example, hydroxyl, thiol, alcohol, sulfonic acid, phosphine, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl and halogen.

In another aspect, $R_{10}$, $R_{10}'$, $R_{11}$, $R_{11}'$, $R_{12}$, $R_{12}'$, $R_{13}$ and $R_{13}'$ are each independently selected from hydrogen, methyl, aralkyl and aryl and $R_9$ and $R_{14}$ are each independently selected from substituted or unsubstituted $C_1$–$C_{10}$ alkyl, $C_1$–$C_{10}$ cycloalkyl, $C_2$–$C_{10}$ alkenyl, aralkyl and aryl.

In another aspect, $R_{10}$, $R_{10}'$, $R_{11}$, $R_{11}'$, $R_{12}$, $R_{12}'$, $R_{13}$ and $R_{13}'$ are each hydrogen and $R_9$ and $R_{14}$ substituents are each independently substituted or unsubstituted and are selected from phenyl, vinyl, methyl, isopropyl, tert-butyl, neopentyl and benzyl.

In another aspect, $R_{10}$, $R_{10}'$, $R_{11}$, $R_{11}'$, $R_{12}$, $R_{12}'$, $R_{13}$, and $R_{13}'$ are each hydrogen and $R_9$ and $R_{14}$ substituents are each independently substituted or unsubstituted and are selected from phenyl, vinyl, methyl, isopropyl, tert-butyl, neopentyl and benzyl; and wherein at least one of the substituents $R_9$ and $R_{14}$ is substituted with at least one moiety selected from $C_1$–$C_5$ alkyl, $C_1$–$C_5$ alkoxy, phenyl and a functional group. Functional groups suitable for use with this aspect of the present invention include, for example, hydroxyl, thiol, thioether, ketone, aldehyde, ester, ether, amine, imine, amide, nitro, carboxylic acid, disulfide, carbonate, isocyanate, carbodiimide, carboalkoxy, carbamate and halogen.

In another aspect, $R_9$ and $R_{14}$ are each independently substituted or unsubstituted aryl.

In another aspect, $R_9$, $R_{10}$, $R_{10}'$, $R_{11}$, $R_{11}'$, $R_{12}$, $R_{12}'$, $R_{13}$, $R_{13}'$ and $R_{14}$ are linked to form a substituted or unsubstituted, saturated or unsaturated ring structure.

In another aspect, $R_9$, $R_{10}$, $R_{10}'$, $R_{11}$, $R_{11}'$, $R_{12}$, $R_{12}'$, $R_{13}$, $R_{13}'$ and $R_{14}$ are linked to form a substituted or unsubstituted, saturated or unsaturated ring structure, wherein the ring structure contains substituents selected from hydrogen, methyl and substituted or unsubstituted aryl, aralkyl, $C_2$–$C_{10}$ alkenyl, $C_1$–$C_{10}$ cycloalkyl and $C_1$–$C_{10}$ alkyl.

In another aspect, $R_9$, $R_{10}$, $R_{10}'$, $R_{11}$, $R_{11}'$, $R_{12}$, $R_{12}'$, $R_{13}$, $R_{13}'$ and $R_{14}$ are linked to form a substituted or unsubstituted, saturated or unsaturated ring structure, wherein the ring structure contains substituents selected from alkoxy, aryloxy and functional groups selected from hydroxyl, thiol, thioether, ketone, aldehyde, ester, ether, amine, imine, amide, nitro, carboxylic acid, disulfide, carbonate, isocyanate, carbodiimide, carboalkoxy, carbamate and halogen.

In another aspect, $R_{10}$, $R_{10}'$, $R_{13}$ and $R_{13}'$ are each independently a hydrogen, a phenyl or together form a cycloalkyl or an aryl optionally substituted with at least one moiety selected from $C_1$–$C_{10}$ alkyl, $C_1$–$C_{10}$ alkoxy, aryl and a functional group selected from hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen; and $R_9$ and $R_{14}$ are each independently $C_1$–$C_{10}$ alkyl or aryl optionally substituted with $C_1$–$C_5$ alkyl, $C_1$–$C_5$ alkoxy, aryl or a functional group selected from hydroxyl, thiol, thioether, ketone, aldehyde, ester, ether, amine, imine, amide, nitro, carboxylic acid, disulfide, carbonate, isocyanate, carbodiimide, carboalkoxy, carbamate and halogen.

In another aspect, $R_{10}$, $R_{10}'$, $R_{14}$ and $R_{14}'$ are both hydrogen or phenyl, or together form a cycloalkyl group; if present, $R_{11}$, $R_{11}'$, $R_{12}$ and $R_{12}'$ are each hydrogen; and $R_9$ and $R_{14}$ are each selected from substituted or unsubstituted aryl.

In another aspect, $R_9$ and $R_{14}$ are independently of formula (V)

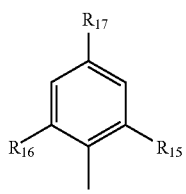

(V)

wherein $R_{15}$, $R_{16}$, and $R_{17}$ are each independently hydrogen, $C_1$–$C_{10}$alkyl, $C_1$–$C_{10}$ alkoxy, aryl or a functional group selected from hydroxyl, thiol, thioether, ketone, aldehyde, ester, ether, amine, imine, amide, nitro, carboxylic acid, disulfide, carbonate, isocyanate, carbodimide, carboalkoxy, carbamate and halogen.

In another aspect, $R_9$ and $R_{14}$ are independently of formula (V), wherein $R_{15}$, $R_{16}$, and $R_{17}$ are each independently selected from hydrogen, methyl, ethyl, propyl, isopropyl, hydroxyl and halogen.

In another aspect, $R_9$ and $R_{14}$ are independently of formula (V), wherein $R_{15}$, $R_{16}$, and $R_{17}$ are each methyl.

In another aspect, the bridging group, Z, may be substituted with one or more moieties selected from $C_1$–$C_{10}$alkyl, $C_1$–$C_{10}$alkoxy and aryl; which in turn may each be further substituted with one or more groups selected from a halogen, a $C_1$–$C_5$ alkyl, $C_1$–$C_5$ alkoxy and phenyl.

In another aspect, the bridging group, Z, may further include one or more functional groups. Functional groups suitable for use in bridging group, Z, include, for example, hydroxyl, thiol, alcohol, sulfonic acid, phosphine, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl and halogen.

Weakly coordinating anion, [WCA], suitable for use with the present invention include $SbF_6^-$, $PF_6^-$, $B(C_6F_5)_4^-$ and $B(C_6H_3(CF_3)_2)_4^-$.

In one aspect, the [WCA] is selected from $SbF_6^-$ and $PF_6^-$.

In another aspect, the [WCA] is selected from $B(C_6H_3(CF_3)_2)_4^-$.

In another aspect, the [WCA] is selected from $B(C_6F_5)_4^-$.

In one embodiment, the catalyst complexes of the present invention may be produced using the process depicted in Equation 1.

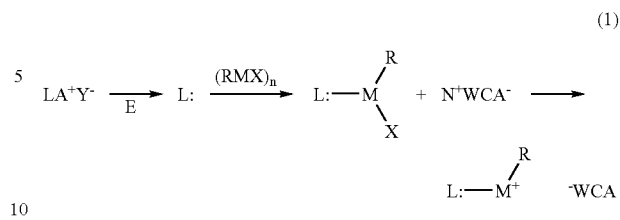

(1)

That is, a ligand precursor ($LA^+Y^-$) is contacted with a suitable reducing agent (E) to generate a ligand, L:. The ligand, L: is then reacted with a metal complex $(RMX)_n$, to form the catalyst precursor, wherein n is 1 or 2. One skilled in the art will recognize to select the appropriate value for n. A salt of a suitable weakly coordinating anion ($N^+WCA^-$) is then added to the catalyst precursor to yield the catalyst complex.

Ligand precursors, ($LA^+Y^-$), suitable for use with the present invention include, for example, 1,3-bis(2,4,6-trimethylphenyl)imidazolium chloride, 1,3-bis(2,6-diisopropylphenyl)-4,5-dihydroimidazolium tetrafluoroborate and 1,3-bis(2,6-methoxyphenyl)-4,5-dimethylimidazolium chloride.

Reducing agents, E, suitable for use with the present invention include, for example, sodium hydride, sodium t-butoxide, sodium methoxide, butyl lithium or potassium t-butoxide.

Metal complexes, (RMX), suitable for use with the present invention include, for example, allylpalladium chloride dimer, di-li–Chlorobis[2-[(dimethylamino)methyl]phenyl-C, N]dipalladium, methallylnickel chloride dimer or Palladium(1+).

salts of weakly coordinating anions, ($N^+WCA^-$), suitable for use with the present invention include, for example, $AgSbF_6$, $AgPF_6$, $LiB(C_6F_5)_4$, $NaB(C_6H_3(CF_3)_2)_4$ or $C_6H_5N(CH_3)_2B(C_6F_5)_4$.

The processes of the present invention for preparing polycyclic polymers and copolymers may be used to prepare a wide range of polymers and copolymers and may include both solution and mass polymerization techniques.

In one embodiment, the polymerization processes of the present invention may be used to produce polymer product having an average molecular weight of 20,000 to 5,000,000; alternatively 50,000 to 2,000,000; alternatively 50,000 to 500,000; alternatively 100,000 to 250,000. In one aspect, these high molecular weight polymer products may, for example, be used as waveguides, dielectrics and airgap providing materials.

In another embodiment, the polymerization processes of the present invention may be used to produce polymer product having an average molecular weight of 1,000 to 20,000; alternatively 1,500 to 10,000; alternatively 2,000 to 7,000. In one aspect, these low molecular weight polymer products may, for example, be used as photoresist materials.

In another embodiment, the polymerization processes of the present invention the catalyst complex and the at least one polycycloolefin monomer are contacted at a temperature of 0 to 200° C.; alternatively 10 to 180° C.; alternatively 20 to 150° C.

In another embodiment of the process of the present invention, the number of monomer molecules used relative to the number of catalyst atoms is 500 to 2,000,000; alternatively 1,000 to 500,000; alternatively 10,000 to 250,000.

To mold plastic articles by reaction injection molding (RIM), resin transfer molding (RTM) liquid injection molding (LIM), casting, lay up or spray up procedures, a reactive formulation of monomers which polymerize to substantially complete conversion to polymer is provided. The reactive formulation of the invention contains polycycloolefin monomers in combination with an activated addition polymerization catalyst system, which polymerizes the monomers to at least 90% conversion, preferably >95% conversion. This invention provides storage stable activator components of such reactive formulations. A polymerization system is provided wherein a storage stable activator component is combined with a separately stored catalyst precursor component. When the storage stable components of the polymerization system are combined in monomer, a reaction mixture is obtained. In preferred embodiments, the polymerization system can be used as a complete feedstock for reaction injection molding (RIM), RTM or LIM processes. The polycyclic monomers within the storage stable components provided by this invention are characterized by the presence of at least one norbornene moiety.

In general, methods for reaction injection molding (RIM), resin transfer molding (RTM) and other commercial bulk-polymerization techniques of thermoplastic or thermosetting resins are known. For example see disclosure provided by Bell et al. in U.S. Pat. No. 6,350,832.

In one embodiment, the present invention provides a RIM process that comprises combining at least two reactant streams to form a reactive monomer composition, which is then, optionally, conveyed into a mold where polymerization proceeds; wherein at least one of the at least two reactant streams contains a catalyst precursor [L:MRX] and a carrier; wherein at least one of the at least two reactant streams contains the salt of a weakly coordinating anion [N$^+$WCA$^-$] and a carrier; wherein the carrier liquid may be a solvent for the catalyst system component or a monomer or mixture of monomers to be polymerized; and wherein at least one of the at least two reactant streams must contain a monomer or monomers to be polymerized; with the proviso that the catalyst precursor, [L:MRX], and the salt of a weakly coordinating anion, [N$^+$WCA$^-$], are not contained in the same one of the at least two reactant streams.

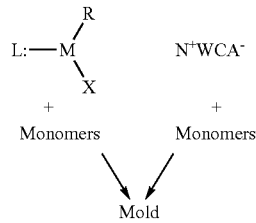

In one aspect, various additives may be included in the reactive monomer composition to modify the properties of the molded articles produced. Non-interfering additives suitable for use with the present invention include, for example, solvents, blowing agents, fillers, fibers, pigments, dyes, lubricants, antioxidants, antiozonants, UV absorbing agents, crosslinking agents, odor absorbing or masking agent, flame retardants, light stabilizers, plasticizers, foaming agents, whiskers for surface smoothing, tougheners, reinforcing agents, impact and polymeric modifiers and viscosifiers. The additives may be added to one or more of the reactant streams as liquids or as solutions in the monomer before injection into the mold.

The terms "polycycloolefin,", "polycyclic", "polycyclicolefin," and "norbornene-type" monomer as used herein and in the appended claims are interchangeable and mean that the monomer contains at least one norbornene moiety as follows:

wherein W''' is selected from the group including, but by no means limited to, an oxygen, a nitrogen with a hydrogen attached thereto, a nitrogen with a linear $C_1$ to $C_{10}$ alkyl grouping attached thereto, a nitrogen with a branched $C_1$ to $C_{10}$ alkyl grouping attached thereto, a sulfur and a methylene group of having the formula —$(CH_2)n'$— wherein n' is an integer from 1 to 5.

Polycyclic monomers suitable for use with the present invention include bicyclic monomers, for example, bicyclo [2.2.1]hept-2-ene also referred to as norbornene.

The term "norbornene-type monomer" as used herein and in the appended claims is meant to encompass norbornene, substituted norbornene, as well as any substituted and unsubstituted higher cyclic derivatives thereof, provided that the subject monomer contains at least one norbornene-type moiety or substituted norbornene-type moiety.

Norbornene-type monomers suitable for use with the present invention include may include substituted norbornene-type monomers and higher cyclic derivatives thereof that contain a pendant hydrocarbyl substituent or a pendant functional substituent containing an oxygen atom.

Norbornene-type monomers suitable for use with the present invention may include norbornene-type or polycycloolefin monomers are represented by the structure below:

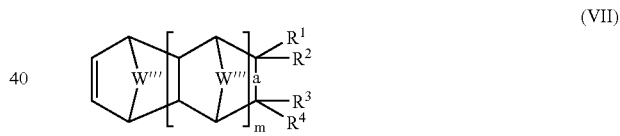

wherein each W''' is independently defined as above; "a" is a single or a double bond; $R^1$, $R^2$, $R^3$, and $R^4$ each independently represent a hydrogen, a hydrocarbyl or a functional substituent; m is an integer from 0 to 5, with the proviso that when "a" is a double bond, both (i) one of $R^1$ and $R^2$ is not present and (ii) one of $R^3$ and $R^4$ is not present.

The term "hydrocarbyl groups" as used herein and in the appended claims encompasses hydrogen, hydrocarbyl groups, halohydrocarbyl groups, perhalohydrocarbyl groups and perhalocarbyl groups. In one embodiment, $R^1$, $R^2$, $R^3$ and/or $R^4$, may independently represent hydrogen, linear or branched $C_1$–$C_{10}$ alkyl, linear or branched $C_2$–$C_{10}$ alkenyl, linear or branched $C_2$–$C_{10}$ alkynyl, $C_4$–$C_{12}$ cycloalkyl, $C_4$–$C_{12}$ cycloalkenyl, $C_6$–$C_{12}$ aryl, and $C_7$–$C_{24}$ aralkyl. In one embodiment, $R^1$ and $R^2$ or $R^3$ and $R^4$ may collectively represent a $C_1$–$C_{10}$ alkylidenyl group. Representative alkyl groups include, but are by no means limited to, methyl, ethyl, propyl, isopropyl, butyl, isobutyl, sec-butyl, tert-butyl, pentyl, neopentyl, hexyl, heptyl, octyl, nonyl and decyl. Representative alkenyl groups include, but are by no means limited to, vinyl, allyl, butenyl and cyclohexenyl. Representative alkynyl groups, include but are by no means limited to, ethynyl, 1-propynyl, 2-propynyl, 1-butynyl and 2-butynyl. Representative cycloalkyl groups include, but are by no means limited to, cyclopentyl, cyclohexyl and cyclooctyl substituents. Representative aryl groups include, but are by no means limited to, phenyl, naphthyl and anthracenyl. Representative aralkyl groups include, but are by no means limited to, benzyl and phenethyl. Representative alkylidenyl groups include, but are by no means limited to, methylidenyl and ethylidenyl groups.

In one embodiment, the perhalohydrocarbyl groups may include perhalogenated phenyl and alkyl groups. The halogenated alkyl groups useful in the invention are partially or fully halogenated and are linear or branched, and have the formula $C_zW'''_{2z+1}$ wherein W''' is independently selected from halogen and hydrogen and z is an integer of 1 to 20. In another embodiment, each W''' is independently selected from hydrogen, chlorine, fluorine and bromine. In another embodiment, each W''' is independently selected from hydrogen and fluorine.

In one embodiment, the perfluorinated substituents include perfluorophenyl, perfluoromethyl, perfluoroethyl, perfluoropropyl, perfluorobutyl and perfluorohexyl. In addition to the halogen substituents, the cycloalkyl, aryl, and aralkyl groups of the present invention may be further substituted with linear or branched $C_1$–$C_5$ alkyl and haloalkyl groups, aryl groups and cycloalkyl groups.

When the pendant group(s) is(are) a functional substituent, $R^1$, $R^2$, $R^3$ may $R^4$ independently represent a radical selected from $(CH_2)_n$—$CH(CF_3)_2$—O—$Si(Me)_3$, —$(CH_2)_n$—$CH(CF_3)_2$—O—$CH_2$—O—$CH_3$, —$(CH_2)_n$—$CH(CF_3)_2$—O —$C(O)$—O—$C(CH_3)_3$, —$CH_2)_n$—$C(CF_3)_2$—OH, —$(CH_2)_nC(O)NH_2$, —$(CH_2)_nC(O)Cl$, —$(CH_2)_nC(O)OR^5$, —$(CH_2)_n$—$OR^5$, —$(CH_2)_n$—$OC(O)R^5$, —$(CH_2)_n$—$C(O)$ $R^5$—$(CH_2)_n$—$OC(O)OR^5$, —$(CH_2)_nSi(R^5)_3$, —$(CH_2)_nSi(OR^5)_3$, —$(CH_2)_n$—O—$Si(R^5)_3$ and —$(CH_2)_nC(O)OR^6$ wherein n independently represents an integer from 0 to 10 and $R^5$ independently represents hydrogen, linear or branched $C_1$–$C_{20}$ alkyl, linear or branched $C_1$–$C_{20}$ halogenated or perhalogenated alkyl, linear or branched $C_2$–$C_{10}$ alkenyl, linear or branched $C_2$–$C_{10}$ alkynyl, $C_5$–$C_{12}$ cycloalkyl, $C_6$–$C_{14}$ aryl, $C_6$–$C_{14}$ halogenated or perhalogenated aryl, and $C_7$–$C_{24}$ aralkyl. Representative hydrocarbyl groups set forth under the definition of $R^5$ are the same as those identified above under the definition of $R^1$ to $R^4$. As set forth above under $R^1$ to $R^4$ the hydrocarbyl groups defined under $R^5$ may be halogenated and perhalogenated. For example, when $R^5$ is $C_1$–$C_{20}$ halogenated or perhalogenated alkyl, $R^5$ may be represented by the formula $C_zW'''_{2z+1}$, wherein z and W''' are defined as above and at least one W''' on the alkyl group is a halogen. It is to be recognized that when the alkyl group is perhalogenated, all W''' substituents are halogenated. Examples of perhalogenated alkyl groups include, but are by no means limited to, trifluoromethyl, trichloromethyl, —$C_7F_{15}$, and —$C_{11}F_{23}$. Examples of perhalogenated aryl groups include, but are by no means limited to, pentachlorophenyl and pentafluorophenyl. The $R^6$ radical represents an acid labile moiety selected from —$C(CH_3)_3$, —$Si(CH_3)_3$, —$CH(R^7)OCH_2CH_3$, —$CH(R^7)OC(CH_3)_3$ or the following cyclic groups:

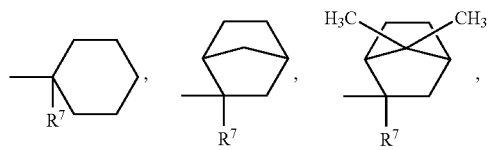

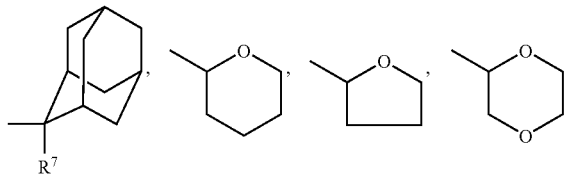

wherein $R^7$ represents hydrogen or a linear or branched ($C_1$–$C_5$) alkyl group. The alkyl groups may include methyl, ethyl, propyl, i-propyl, butyl, i-butyl, t-butyl, pentyl, t-pentyl and neopentyl. In the above structures, the single bond line projecting from the cyclic groups indicates the position where the cyclic protecting group is bonded to the acid substituent. Examples of $R^6$ radicals include 1-methyl-1-Cyclohexyl, isobornyl, 2-methyl-2-isobornyl, 2-methyl-2-adamantyl, tetrahydrofuranyl, tetrahydropyranoyl, 3-oxocyclohexanonyl, mevalonic lactonyl, 1-ethoxyethyl and 1-t-butoxy ethyl.

The $R^6$ radical can also represent dicyclopropylmethyl (Dcpm), and dimethylcyclopropylmethyl (Dmcp) groups which are represented by the following structures:

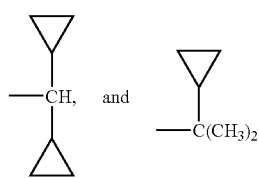

In the structure (VII) above, $R^1$ and $R^4$ together with the two ring carbon atoms to which they are attached may represent a substituted or unsubstituted cycloaliphatic group containing 4 to 30 ring carbon atoms, a substituted or unsubstituted aryl group containing 6 to 18 ring carbon atoms, or a combination thereof. The cycloaliphatic group can be monocyclic or polycyclic. When unsaturated, the cyclic group may contain monounsaturation or multiunsaturation. In one embodiment, the unsaturated cyclic group may be a monounsaturated cyclic group. When substituted, the rings may contain monosubstitution or multisubstitution, wherein the substituents may independently be selected from hydrogen, linear or branched $C_1$–$C_5$ alkyl, linear or branched $C_1$–$C_5$ haloalkyl, linear or branched $C_1$–$C_5$ alkoxy, halogen and combinations thereof. $R^1$ and $R^4$ may be taken together to form the divalent bridging group, —C(O)-Q-(O)C—, which when taken together with the two ring carbon atoms to which they are attached form a pentacyclic ring, wherein Q represents an oxygen atom or the group $N(R^8)$, and $R^8$ may be selected from hydrogen, halogen, linear or branched $C_1$–$C_{10}$ alkyl, and $C_6$–$C_{18}$ aryl. A representative structure is shown in below as Structure (VIIa):

(VIIa)

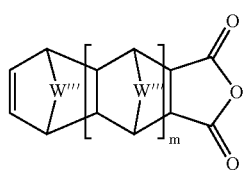

wherein each W''' is independently defined as above and m is an integer from 0 to 5.

Deuterium enriched norbornene-type monomers wherein at least one of the hydrogen atoms on the norbornene-type moiety and/or one at least one of the hydrogen atoms on a pendant hydrocarbyl substituent described under $R^1$ to $R^4$ have been replaced by a deuterium atom are contemplated within the scope of the present invention. In one embodiment, at least 40 percent of the hydrogen atoms on the norbornene-type moiety and/or the hydrocarbyl substituent are replaced by deuterium. In another embodiment, at least about 50 percent of the hydrogen atoms on the norbornene-type moiety and/or the hydrocarbyl substituent are replaced by deuterium. In yet another embodiment, at least about 60 percent of the hydrogen atoms on the norbornene-type moiety and/or the hydrocarbyl substituent are replaced by deuterium. In one embodiment, the deuterated monomers are represented by Structure (VIIb) below:

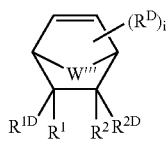

(VIIb)

wherein W''' is defined as above, $R^D$ is deuterium, "i" is an integer from 0 to 6, $R^1$ and $R^2$ independently represent a hydrocarbyl or functional substituent as defined above and $R^{1D}$ and $R^{2D}$ may or may not be present and independently represent a deuterium atom or a deuterium enriched hydrocarbyl group containing at least one deuterium atom; with the proviso that when "i" is 0, at least one of $R^{1D}$ and $R^{2D}$ must be present. In one embodiment, the deuterated hydrocarbyl group is selected from linear or branched $C_1$–$C_{10}$ alkyl wherein at least 40 percent of the hydrogen atoms on the carbon backbone are replaced by deuterium. In another embodiment, the deuterated hydrocarbyl group is selected from linear or branched $C_1$–$C_{10}$ alkyl wherein at least 50 percent of the hydrogen atoms on the carbon backbone are replaced by deuterium. In yet another embodiment, the deuterated hydrocarbyl group is selected from linear or branched $C_1$–$C_{10}$ alkyl wherein at least 60 percent of the hydrogen atoms on the carbon backbone are replaced by deuterium.

Crosslinked polymers can be prepared by copolymerizing the norbornene-type monomer(s) set forth under Structure (VII) above with a multifunctional norbornene-type crosslinking monomer(s). By multifunctional norbornene-type crosslinking monomer is meant that the crosslinking monomer contains at least two norbornene-type moieties (norbornene-type double bonds), each functionality being polymerizable in the presence of the catalyst system of the present invention. The crosslinkable monomers include fused multicyclic ring systems and linked multicyclic ring systems. Examples of fused crosslinking agents are illustrated in structures below. For brevity, norbornadiene is included as a fused multicyclic crosslinking agent and is considered to contain two polymerizable norbornene-type double bonds.

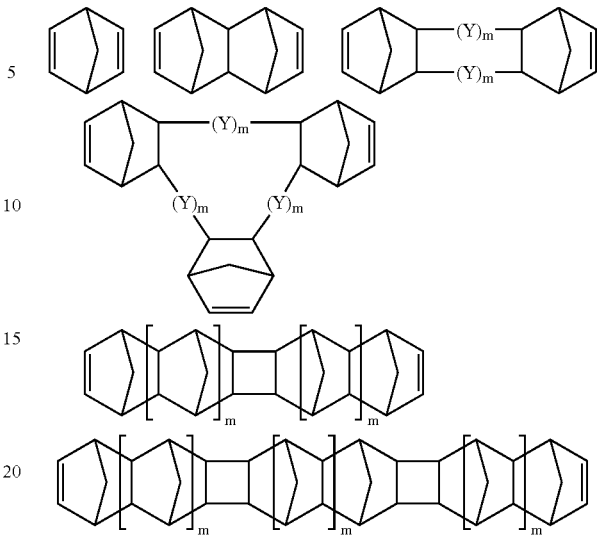

wherein Y represents a methylene (—$CH_2$—) group and m independently represents an integer from 0 to 5, and when m is 0, Y represents a single bond. Representative monomers under the forgoing formulae are disclosed by, for example, Bell et al. in U.S. Pat. No. 6,350,832.

Some embodiments of the present invention will now be described in detail in the following Examples.

EXAMPLE 1

Synthesis of
(1,3-bis(2,4,6-trimethylphenyl)imidazol-2-ylidene

In a dry box, 2.0 g (5.87 mmol) 1,3-bis(2,4,6-trimethylphenyl)imidazolium chloride and 50 mL tetrahydrofuran (THF) was added to a 100 mL Kjeldahl flask. After allowing this mixture to stir for 15 minutes, 0.66 g (5.88 mmol) potassium t-butoxide was added to the flask, immediately producing an orange color. After stirring an additional 20 minutes, the volatiles were removed under vacuum, leaving an orange solid. This solid was extracted three times with warm hexanes (20 mL/extraction at 50° C.). The filtrates were filtered over Celite and the hexanes were concentrated to ⅓ the original volume. The flask was then warmed to dissolve most of the precipitated solid and placed in a drybox freezer at −37° C. overnight. The hexanes were then decanted. To the original flask was added about 10 mL hexane. The flask was heated to dissolve the off-white solid and was allowed to stand at room temperature for 60 minutes, whereupon it was placed in a freezer at −37° C. overnight. The crystals were then filtered and dried under vacuum to afford 0.75 g of product.

EXAMPLE 2

Synthesis of
1,3-bis(2,6-diisopropylphenyl)imidazole-2-ylidene

To a 10 mL serum vial in a dry box was added 2.00 g (4.70 mmol) 1,3(bis(2,6-diisopropylphenyl)imidazolium chloride and 50 mL tetrahydrofuran (THF) was added to a 100 mL Kjeldahl flask. After allowing this mixture to stir for 15 minutes, 0.56 g (4.98 mmol) potassium t-butoxide was added to the flask, immediately producing an orange color. After stirring an additional 20 minutes, the volatiles were removed under vacuum, leaving an orange solid. This solid was extracted three times with warm toluene (20 mL/extraction at 60° C.). The filtrates were filtered over Celite and the toluene was removed under vacuum. The orange solid was recrystallized from hot hexanes and afforded 1.33 g of white needle-like crystals.

EXAMPLE 3

Synthesis of allyl palladium chloride 1,3(bis(2,4,6-trimethylphenyl)imidazole-2-ylidene To a 50 mL serum vial in a dry box was added 0.433 g (2.56 mmol) allyl palladium chloride in 10 mL THF. To this solution was added 1.00 g (2.57 mmol) 1,3(bis(2,4,6-trimethylphenyl)imidazole-2-ylidene) dissolved in 10 mL THF. The resulting solution was stirred in the drybox for 15 minutes, whereupon it was removed from the drybox and filtered through a plug of silica loaded into a disposable pipet. The silica plug was washed with 20 mL additional THF. The resulting solution was then transferred to a vacuum flask and the THF was removed under vacuum. The residual solid was washed for 18 hours with 50 mL heptane, vacuum filtered and dried to afford 1.03 g of product as an off-white solid.

EXAMPLE 4

Synthesis of allyl palladium chloride 1,3(bis(2,6-diisopropylphenyl)imidazole-2-ylidene To a 10 mL serum vial in a dry box was added 0.23 g (0.601 mmol) 1,3(bis(2-6,diisopropylphenyl)imidazole-2-ylidene dissolved in 2 mL THF. To resulting solution was then added 0.1 g (0.55 mmol) allyl palladium chloride in 2 mL THF. The resulting solution was stirred in the drybox for 10 minutes, whereupon it was removed from the drybox and filtered through a plug of silica loaded into a disposable pipet. The silica plug was washed with 10 mL additional THF. The resulting solution was then transferred to a vacuum flask and the THF was removed under vacuum to afford 0.28 g of product as an off-white solid.

EXAMPLE 5

Polymerization of norbornene monomer in the presence of allyl palladium chloride 1,3(bis(2,6-diisopropylphenyl)imidazole-2-ylidene A. Catalyst Formation To a clean, dry 5 mL serum vial in a drybox was added 4.1 mg (7.2 µmol) Allyl palladium chloride 1,3(bis-(2,6-diisopropylphenyl)imidazole-2-ylidene and 0.5 mL MeCl$_2$. To a second 5 mL vial was added 2.5 mg (7.2 µmol) AgSbF$_6$+0.5 mL MeCl$_2$. The contents of the two vials were then combined with shaking for about 5 minutes. The resultant mixture containing catalyst was yellow in color with a flocculant, off white precipitate.

B. Polymerization

To a clean, dry 50 mL serum vial under N$_2$ and equipped with a Teflon® coated stirring bar was added 2.3 g (12 mmol) of a 49 mol % norbornene/toluene solution, followed by 10 mL toluene. The vial was placed in a water bath and allowed to equilibrate to 50° C. The resultant mixture containing catalyst prepared in A was then added to the vial via syringe. The reaction was allowed to proceed for 2 hours, after which it was terminated by adding 1.0 mL acidified MeOH (10% HCL in MeOH). The resulting polymer was precipitated into 200 mL of rapidly stirring acetone, which was subsequently filtered under vacuum, washed with excess acetone and dried overnight under vacuum at 60° C. to yield 1.10 g of polymer product.

EXAMPLE 6

Copolymerization of norbornene and methyl acrylate in the presence of allyl palladium chloride 1,3(bis(2,6-diisopropylphenyl)imidazole-2-ylidene A. Catalyst Formation To a clean, dry 5 mL serum vial in a drybox was added 4.1 mg (7.2 µmol) Allyl palladium chloride 1,3(bis-(2,6-diisopropylphenyl)imidazole-2-ylidene and 0.5 mL MeCl$_2$. To a second 5 mL vial was added 2.5 mg (7.2 µmol) AgSbF$_6$+0.5 mL MeCl$_2$. The contents of the two vials were then combined with shaking for about 5 minutes. The resultant mixture containing catalyst was yellow in color with a flocculant, off white precipitate.

B. Copolymerization

To a clean, dry 50 mL serum vial under N$_2$ and equipped with a Teflon® coated stirring bar was added 2.3 g (12 mmol) of a 49 mol % norbornene/toluene solution, 1.03 g (12 mmol) methyl acrylate and 10 mL toluene. The vial was placed in a water bath and allowed to equilibrate to 50° C. The resultant mixture containing catalyst prepared in A was then added to the vial via syringe. The reaction was allowed to proceed for 2 hours, after which it was terminated by adding 1.0 mL acidified MeOH (10% HCL in MeOH). The resulting polymer was precipitated into 200 mL rapidly stirring acetone, which was subsequently filtered under vacuum, washed with excess acetone and dried overnight under vacuum at 60° C. to yield 1.17 g of polymer product.

EXAMPLE 7

Polymerization of norbornene in presence of allyl palladium chloride 1,3(bis(2,6-diisopropylphenyl)imidazole-2-ylidene A. Catalyst Formation To a clean, dry 5 mL serum vial in a drybox was added 1.0 mg (1.8 µmol) Allyl palladium chloride 1,3(bis-(2,6-diisopropylphenyl)imidazole-2-ylidene and 0.5 mL MeCl$_2$. To a second 5 mL vial was added 0.61 mg (1.8 µmol) AgSbF$_6$+ 0.5 mL MeCl$_2$. The contents of the two vials were then combined with shaking for about 5 minutes. The resultant mixture containing catalyst was yellow in color with a flocculant, off white precipitate.

B. Polymerization

To a clean, dry 50 mL serum vial under N$_2$ and equipped with a Teflon® coated stirring bar was added 17.28 g (90 mmol) of a 49 mol % norbornene/toluene solution and 10 mL toluene. The vial was then placed in a water bath and allowed to equilibrate to 50° C. The resultant mixture containing catalyst prepared in A was then added to the vial via syringe. The reaction was allowed to proceed for 2 hours, after which it was terminated by adding 3.0 mL acidified MeOH (10% HCL in MeOH). The resulting polymer was then precipitated into 400 mL rapidly stirred acetone, which was subsequently filtered under vacuum, washed with excess acetone and dried overnight under vacuum at 60° C. to yield 8.39 g of polymer product.

EXAMPLE 8

Polymerization of norbornene in the presence of H$_2$O and allyl palladium chloride 1,3(bis(2,6-diisopropylphenyl)imidazole-2-ylidene A. Catalyst Formation To a clean, dry 5 mL serum vial in a drybox was added 4.1 mg (7.2 µmol) Allyl palladium chloride 1,3(bis-(2,6-diisopropylphenyl)imidazole-2-ylidene and 0.5 mL MeCl$_2$. To a second 5 mL vial was added 2.5 mg (7.2 µmol) AgSbF$_6$+0.5 mL MeCl$_2$. The contents of the two vials were then combined with shaking for about 5 minutes. The resultant mixture containing catalyst was yellow in color with a flocculant, off white precipitate.

B. Polymerization

To a clean, dry 50 mL serum vial under N$_2$ and equipped with a Teflon® coated stirring bar was added 2.30 g (12.0 mmol) of a 49 mol % norbornene/toluene solution, 2.0 mL toluene and 5.0 mL deionized H$_2$O. The vial was placed in a water bath and allowed to equilibrate to 50° C. The resultant mixture containing catalyst prepared in A was then added to the vial via syringe, whereupon the contents of the vial immediately solidified. The reaction was allowed to proceed for 4 hours, after which it was terminated by adding 1.0 mL acidified MeOH (10% HCL in MeOH). The resulting polymer mixture was added to 400 mL rapidly stirred acetone, which was subsequently filtered under vacuum, washed with excess acetone and dried overnight under vacuum at 60° C. to yield 1.10 g of polymer product.

EXAMPLE 9

Polymerization of 5-butyl-2-norbornene in the present of allyl palladium chloride 1,3(bis(2,6-diisopropylphenyl)imidazole-2-ylidene A. Catalyst Formation To a clean, dry 5 mL serum vial in a drybox was added 4.1 mg (7.2 µmol) Allyl palladium chloride 1,3(bis-(2,6-diisopropylphenyl)imidazole-2-ylidene and 0.5 mL MeCl$_2$. To a second 5 mL vial was added 2.5 mg (7.2 µmol) AgSbF$_6$+0.5 mL MeCl$_2$. The contents of the two vials were then combined with shaking for about 5 minutes. The resultant mixture containing catalyst was yellow in color with a flocculant, off white precipitate.

B. Polymerization

To a clean, dry 50 mL serum vial under N$_2$ and equipped with a Teflon® coated stirring bar was added 1.00 g (6.66 mmol) of 5-butyl-2-norbornene and 10 mL toluene. The vial was then placed in a water bath and allowed to equilibrate to 50° C. The resultant mixture containing catalyst prepared in A was then added to the vial via syringe. Stirring in the vial stopped about 5 minutes after addition of the catalyst. The reaction was then allowed to proceed for 3 hours, after which it was terminated by adding 1.0 mL acidified MeOH (10% HCL in MeOH). The resulting polymer mixture was added to 200 mL rapidly stirred acetone, which was subsequently filtered under vacuum, washed with excess acetone and dried overnight under vacuum at 60° C. to yield 0.98 g of polymer product.

EXAMPLE 10

Copolymerization of 5-butyl-2-norbornene and methyl acrylate in the presence of allyl palladium chloride 1,3(bis(2,6-diisopropylphenyl)imidazole-2-ylidene A. Catalyst Formation To a clean, dry 5 mL serum vial in a drybox was added 4.1 mg (7.2 µmol) Allyl palladium chloride 1,3(bis-(2,6-diisopropylphenyl)imidazole-2-ylidene and 0.5 mL MeCl$_2$. To a second 5 mL vial was added 2.5 mg (7.2 µmol) AgSbF$_6$+0.5 mL MeCl$_2$. The contents of the two vials were then combined with shaking for about 5 minutes. The resultant mixture containing catalyst was yellow in color with a flocculant, off white precipitate.

B. Copolymerization

To a clean, dry 50 mL serum vial under N$_2$ and equipped with a Teflon® coated stirring bar was added 1.00 g (6.66 mmol) of 5-butyl-2-norbornene, 1.03 g (12.0 mmol) methyl acrylate and 10 mL toluene. The vial was then placed in a water bath and allowed to equilibrate to 50° C. The resultant mixture containing catalyst prepared in A was then added to the vial via syringe. Stirring in the vial stopped about 5 minutes after addition of the catalyst. The reaction was allowed to proceed for 3 hours, after which it was terminated by adding 1.0 mL acidified MeOH (10% HCL in MeOH). The resulting polymer mixture was then added to 200 mL rapidly stirred acetone, which was subsequently filtered under vacuum, washed with excess acetone and dried overnight under vacuum at 60° C. to yield 0.67 g of polymer product.

EXAMPLE 11

Copolymerization of norbornene with 5-hydroxyl-2-norbornene in the presence of allyl palladium chloride 1,3(bis(2,6-diisopropylphenyl)imidazole-2-ylidene A. Catalyst Formation To a clean, dry 5 mL serum vial in a drybox was added 6.8 mg (12 µmol) Allyl palladium chloride 1,3(bis-(2,6-diisopropylphenyl)imidazole-2-ylidene and 0.5 mL MeCl$_2$. To a second 5 mL vial was added 4.1 mg (12 µmol) AgSbF$_6$+0.5 mL MeCl$_2$. The contents of the two vials were then combined with shaking for about 5 minutes. The resultant mixture containing catalyst was yellow in color with a flocculant, off white precipitate.

B. Copolymerization

To a clean, dry 50 mL serum vial under N$_2$ and equipped with a Teflon® coated stirring bar was added 1.00 g (9.08 mmol) of 5-hydroxyl-2-norbornene and 1.26 g (10.6 mmol) norbornene (79 wt % in toluene) and 10 mL toluene. The vial was then placed in a water bath. After equilibration to 50° C., the resultant mixture containing catalyst prepared in A was added to the vial via syringe. Stirring in the vial stopped about 5 minutes after addition of the catalyst. The reaction was then allowed to proceed for 2 hours, after which it was terminated by adding 1.0 mL acidified MeOH (10% HCL in MeOH). The resulting polymer mixture was then added to 200 mL rapidly stirred acetone, which was subsequently filtered under vacuum, washed with excess acetone and dried overnight under vacuum at 60° C. to yield 1.30 g of polymer product.

EXAMPLE 12

Copolymerization of norbornene with 5-methanol-2-norbornene in the presence of allyl palladium chloride 1,3(bis(2,6-diisopropylphenyl)imidazole-2-ylidene A. Catalyst Formation To a clean, dry 5 mL serum vial in a drybox was added 6.8 mg (12 µmol) Allyl palladium chloride 1,3(bis-(2,6-diisopropylphenyl)imidazole-2-ylidene and 0.5 mL MeCl$_2$. To a second 5 mL vial was added 4.1 mg (12 µmol) AgSbF$_6$+0.5 mL MeCl$_2$. The contents of the two vials were then combined with shaking for about 5 minutes. The resultant mixture containing catalyst was yellow in color with a flocculant, off white precipitate.

B. Copolymerization

To a clean, dry 50 mL serum vial under N$_2$ and equipped with a Teflon® coated stirring bar was added 1.00 g (8.05 mmol) of 5-methanol-2-norbornene and 1.26 g (10.6 mmol) norbornene (79 wt % in toluene) and 10 mL toluene. The vial was then placed in a water bath. After equilibration to 50° C., the resultant mixture containing catalyst prepared in A was added to the vial via syringe. The reaction was then allowed to proceed for 18 hours, after which it was terminated by adding 1.0 mL acidified MeOH (10% HCL in MeOH). The resulting polymer mixture was added to 200 mL rapidly stirred acetone, which was subsequently filtered under vacuum, washed with excess acetone and dried overnight under vacuum at 60° C. to yield 0.64 g of polymer product.

EXAMPLE 13

Copolymerization of norbornene with methyl acrylate in the presence of allyl palladium chloride 1,3(bis(2,6-diisopropylphenyl)imidazole-2-ylidene A. Catalyst Formation To a clean, dry 5 mL serum vial in a drybox was added 6.8 mg (12 µmol) Allyl palladium chloride 1,3(bis-(2,6-diisopropylphenyl)imidazole-2-ylidene and 0.5 mL MeCl$_2$. To a second 5 mL vial was added 2.8 mg (3.1 µmol) sodium tetrakis(pentafluorophenyl)borane (NaB(C$_6$F$_5$)$_4$)+0.5 mL MeCl$_2$. The contents of the two vials were then combined with shaking for about 5 minutes. The resultant mixture containing catalyst was yellow/brown in color with a small amount of flocculant, light brown precipitate.

B. Copolymerization

To a clean, dry 50 mL serum vial under N$_2$ and equipped with a Teflon® coated stirring bar was added 1.26 g (10.6 mmol) of norbornene (79 wt % in toluene) and 1.00 g (11.61 mmol) methyl acrylate and 10 mL toluene. The vial was then placed in a water bath and allowed to equilibrate to 50° C., whereupon, the resultant mixture containing catalyst prepared in A was added to the vial via syringe. The reaction was then allowed to proceed for 2 hours, after which it was terminated by adding 1.0 mL acidified MeOH (10% HCL in MeOH). The resulting polymer mixture was then added to 200 mL rapidly stirred acetone, which was subsequently filtered under vacuum, washed with excess acetone and dried overnight under vacuum at 60° C. to yield 0.99 g of polymer product.

EXAMPLE 14

Copolymerization of norbornene with 5-hydroxyl-2-norbornene in the presence of allyl palladium chloride 1,3(bis(2,6-diisopropylphenyl)imidazole-2-ylidene A. Catalyst Formation To a clean, dry 5 mL serum vial in a drybox was added 6.8 mg (12 µmol) Allyl palladium chloride 1,3(bis-(2,6-diisopropylphenyl)imidazole-2-ylidene and 0.50 mL MeCl$_2$. To a second 5 mL vial was added 2.8 mg (3.1 µmol) Na(C$_6$F$_5$)$_4$+0.50 mL MeCl$_2$. The contents of the two vials were then combined with shaking for about 5 minutes. The resultant mixture containing catalyst was yellow/brown in color with a small amount of flocculant, light brown precipitate.

B. Copolymerization

To a clean, dry 50 mL serum vial under N$_2$ and equipped with a Teflon® coated stirring bar was added 1.00 g (9.08 mmol) of 5-hydroxyl-2-norbornene and 1.26 g (10.6 mmol) norbornene (79 wt % in toluene) and 10 mL toluene. The vial was then placed in a water bath. After equilibration to 50° C., the resultant mixture containing catalyst prepared in A was added to the vial via syringe. The reaction was allowed to proceed for 2 hours, after which it was terminated by adding 1.0 mL acidified MeOH (10% HCL in MeOH). The resulting polymer mixture was then added to 200 mL rapidly stirred acetone, which was subsequently filtered under vacuum, washed with excess acetone and dried overnight under vacuum at 60° C. to yield 1.49 g of polymer product.

EXAMPLE 15

Copolymerization of norbornene with 5-methanol-2-norbornene in the presence of allyl palladium chloride 1,3(bis(2,6-diisopropylphenyl)imidazole-2-ylidene A. Catalyst Formation To a clean, dry 5 mL serum vial in a drybox was added 6.8 mg (12 µmol) Allyl palladium chloride 1,3(bis-(2,6-diisopropylphenyl)imidazole-2-ylidene and 0.5 mL MeCl$_2$. To a second 5 mL vial was added 2.8 mg (3.1 µmol) NaB(C$_6$F$_5$)$_4$+0.5 mL MeCl$_2$. The contents of the two vials were then combined with shaking for about 5 minutes. The resultant mixture containing catalyst was yellow/brown in color with a small amount of flocculant, light brown precipitate.

B. Copolymerization

To a clean, dry 50 mL serum vial under N$_2$ and equipped with a Teflon® coated stirring bar was added 1.00 g (8.05 mmol) of 5-methanol-2-norbornene and 1.26 g (10.6 mmol) norbornene (79 wt % in toluene) and 10 mL toluene. The vial was then placed in a water bath. After equilibration to 50° C., the resultant mixture containing catalyst prepared in A was added to the vial via syringe. The reaction was then allowed to proceed for 18 hours, after which it was terminated by adding 1.0 mL acidified MeOH (10% HCL in MeOH). The resulting polymer mixture was then added to 200 mL rapidly stirred acetone, which was subsequently filtered under vacuum, washed with excess acetone and dried overnight under vacuum at 60° C. to yield 1.10 g of polymer product.

EXAMPLE 16

Copolymerization of norbornene with 5-hexafluoroisopropanol-2-norbornene in the presence of allyl palladium chloride 1,3(bis(2,4,6-trimethylphenyl)imidazole-2-ylidene A. Catalyst Formation To a clean, dry 5 mL serum vial in a drybox was added 3.4 mg (7.0 μmol) Allyl palladium chloride 1,3(bis-(2,4,6-trimethylphenyl)imidazole-2-ylidene and 0.5 mL MeCl$_2$. To a second 5 mL vial was added 2.8 mg (3.1 μmol) NaB(C$_6$F$_5$)$_4$+0.5 mL MeCl$_2$. The contents of the two vials were then combined with shaking for about 5 minutes. The resultant mixture containing catalyst was yellow/brown in color with a small amount of flocculant, light brown precipitate.

B. Copolymerization

To a clean, dry 50 mL serum vial under N$_2$ and equipped with a Teflon® coated stirring bar was added 1.26 g (10.6 mmol) of norbornene (79% by wt in toluene) and 1.00 g (3.65 mmol) 5-hexafluoroisopropanol-2-norbornene and 10 mL toluene. The vial was then placed in a water bath. After equilibration to 50° C., the resultant mixture containing catalyst prepared in A was added to the vial via syringe. The reaction was then allowed to proceed for 2 hours, after which it was terminated by adding 1.0 mL acidified MeOH (10% HCL in MeOH). The resulting polymer mixture was then added to 200 mL rapidly stirred MeOH, which was subsequently filtered under vacuum, washed with excess MeOH and dried overnight under vacuum at 60° C. to yield 1.37 g of polymer product.

EXAMPLE 17

Polymerization of norbornene in the presence of allyl palladium chloride 1,3(bis(2,4,6-trimethylphenyl)imidazole-2-ylidene A. Catalyst Formation To a clean, dry 5 mL serum vial in a drybox was added 3.4 mg (7.0 μmol) Allyl palladium chloride 1,3(bis-(2,4,6-trimethylphenyl)imidazole-2-ylidene and 0.5 mL MeCl$_2$. To a second 5 mL vial was added 2.8 mg (3.1 μmol) NaB(C$_6$F$_5$)$_4$+0.5 mL MeCl$_2$. The contents of the two vials were then combined with shaking for about 5 minutes. The resultant mixture containing catalyst was yellow/brown in color with a small amount of flocculent, light brown precipitate.

B. Polymerization

To a clean, dry 50 mL serum vial under N$_2$ and equipped with a Teflon® coated stirring bar was added 1.41 g (11.8 mmol) of norbornene (79 wt % in toluene) and 10 mL toluene. The vial was then placed in a water bath. After equilibration to 50° C., the resultant mixture containing catalyst prepared in A was added to the vial via syringe. The reaction was then allowed to proceed for 30 minutes, after which it was terminated by adding 1.0 mL acidified MeOH (10% HCL in MeOH). The resulting polymer mixture was then added to 200 mL rapidly stirred acetone, which was subsequently filtered under vacuum, washed with excess acetone and dried overnight under vacuum at 60° C. to yield 1.10 g of polymer product.

EXAMPLE 18

Copolymerization of norbornene with 5-triethoxysilyl-2-norbornene in the presence of allyl palladium chloride 1,3(bis(2,4,6-trimethylphenyl)imidazole-2-ylidene A. Catalyst Formation To a clean, dry 5 mL serum vial in a drybox was added 3.4 mg (7.0 μmol) Allyl palladium chloride 1,31,3(bis-(2,4,6-trimethylphenyl)imidazole-2-ylidene and 0.5 mL MeCl$_2$. To a second 5 mL vial was added 2.8 mg (3.1 μmol) NaB(C$_6$F$_5$)$_4$+0.5 mL MeCl$_2$. The contents of the two vials were then combined with shaking for about 5 minutes. The resultant mixture containing catalyst was yellow/brown in color with a small amount of flocculant, light brown precipitate.

B. Copolymerization

To a clean, dry 50 mL serum vial under N$_2$ and equipped with a Teflon® coated stirring bar was added 1.26 g (10.6 mmol) of norbornene (79% by wt in toluene) and 1.00 g (3.90 mmol) 5-triethoxysilyl-2-norbornene and 10 mL toluene. The vial was then placed in a water bath. After equilibration to 50° C., the resultant mixture containing catalyst prepared in A was added to the vial via syringe. The reaction was then allowed to proceed for 2 hours, after which the resulting polymer mixture was added to 200 mL rapidly stirred MeOH, which was subsequently filtered under vacuum, washed with excess MeOH and dried overnight under vacuum to yield 1.90 g of polymer product.

EXAMPLE 19

Copolymerization of norbornene with 5-triethoxysilyl-2-norbornene and Methyl acrylate in the presence of allyl palladium chloride 1,3(bis(2,4,6-trimethylphenyl)imidazole-2-ylidene A. Catalyst Formation To a clean, dry 5 mL serum vial in a drybox was added 3.4 mg (7.0 μmol) Allyl palladium chloride 1,3(bis-(2,4,6-trimethylphenyl)imidazole-2-ylidene and 0.5 mL MeCl$_2$. To a second 5 mL vial was added 2.8 mg (3.1 μmol) NaB(C$_6$F$_5$)$_4$+0.5 mL MeCl$_2$. The contents of the two vials were then combined with shaking for about 5 minutes. The resultant mixture containing catalyst was yellow/brown in color with a small amount of flocculant, light brown precipitate.

B. Copolymerization

To a clean, dry 50 mL serum vial under N$_2$ and equipped with a Teflon® coated stirring bar was added 1.26 g (10.6 mmol) of norbornene (79% by wt in toluene), 1.0 g (11.6 mmol) methyl acrylate, 1.00 g (3.90 mmol) 5-triethoxysilyl-2-norbornene and 10 mL toluene. The vial was then placed in a water bath. After equilibration to 50° C., the resultant mixture containing catalyst prepared in A was added to the vial via syringe. The reaction was then allowed to proceed for 2 hours, after which the resulting polymer mixture was added to 200 mL rapidly stirred MeOH, which was subsequently filtered under vacuum, washed with excess MeOH and dried overnight under vacuum to yield 1.83 g of polymer product.

EXAMPLE 20

Homopolymerization of bicyclo[2.2.1]hept-5-ene-2-carboxylic acid methyl ester in the presence of allyl palladium chloride 1,3(bis(2,4,6-trimethylphenyl)imidazole-2-ylidene A. Catalyst Formation To a clean, dry 5 mL serum vial in a drybox was added 5.9 mg (12 μmol) Allyl palladium chloride 1,3(bis-(2,4,6-trimethylphenyl)imidazole-2-ylidene and 0.5 mL MeCl$_2$. To a second 5 mL vial was added 4.1 mg (12 μmol) AgSbF$_6$+0.5 mL MeCl$_2$. The contents of the two vials were then combined with shaking for about 5 minutes. The resultant mixture containing catalyst was yellow in color containing a white, flocculant precipitate.

B. Homopolymerization

To a clean, dry 50 mL serum vial under N$_2$ and equipped with a Teflon® coated stirring bar was added 0.50 g (3.28 mmol) bicyclo[2.2.1]hept-5-ene-2-Carboxylic acid methyl ester and 10 mL toluene. The vial was then placed in a water bath. After equilibration to 50° C., the resultant mixture containing catalyst prepared in A was added to the vial via syringe. The reaction was then allowed to proceed for 2 hours, after which the resulting polymer mixture was added to 200 mL rapidly stirred MeOH, which was subsequently filtered under vacuum, washed with excess MeOH and dried overnight under vacuum to yield 0.1 g of polymer product.

EXAMPLE 21

Copolymerization of norbornene with bicyclo[2.2.1]hept-5-ene-2-carboxylic acid methyl ester in the presence of allyl palladium chloride 1,3(bis(2,4,6-trimethylphenyl)imidazole-2-ylidene A. Catalyst Formation To a clean, dry 5 mL serum vial in a drybox was added 5.9 mg (12 μmol) Allyl palladium chloride 1,3(bis-(2,4,6-trimethylphenyl)imidazole-2-ylidene and 0.5 mL MeCl$_2$. To a second 5 mL vial was added 4.1 mg (12 μmol) AgSbF$_6$+0.5 mL MeCl$_2$. The contents of the two vials were then combined with shaking for about 5 minutes. The resultant mixture containing catalyst was yellow in color containing a white, flocculant precipitate.

B. Copolymerization

To a clean, dry 50 mL serum vial under N$_2$ and equipped with a Teflon® coated stirring bar was added 0.950 g (5.3 mmol) of norbornene (79% by wt in toluene) and 0.25 g (1.64 mmol) bicyclo[2.2.1]hept-5-ene-2-Carboxylic acid methyl ester and 10 mL toluene. The vial was then placed in a water bath. After equilibration to 50° C., the resultant mixture containing catalyst prepared in A was added to the vial via syringe. The reaction was then allowed to proceed for 2 hours, after which the resulting polymer mixture was added to 200 mL rapidly stirred MeOH, which was subsequently filtered under vacuum, washed with excess MeOH and dried overnight under vacuum to yield 1.0 g of polymer product.

EXAMPLE 22

Copolymerization of 5-butyl-2-norbornene with methyl acrylate in the presence of allyl palladium chloride 1,3(bis(2,4,6-trimethylphenyl)imidazole-2-ylidene A. Catalyst Formation To a clean, dry 5 mL serum vial in a drybox was added 5.9 mg (12 μmol) Allyl palladium chloride 1,3(bis-(2,4,6-trimethylphenyl)imidazole-2-ylidene and 0.50 mL MeCl$_2$. To a second 5 mL vial was added 4.1 mg (12 μmol) AgSbF$_6$+0.50 mL MeCl$_2$. The contents of the two vials were then combined with shaking for about 5 minutes. The resultant mixture containing catalyst was yellow in color containing a white, flocculant precipitate.

B. Copolymerization

To a clean, dry 50 mL serum vial under N$_2$ and equipped with a Teflon® coated stirring bar was added 1.00 g (6.66 mmol) of 5-butyl-2-norbornene, 1.50 g (17.4 mmol) methyl acrylate and 10 mL toluene. The vial was then placed in a water bath and allowed to equilibrate to 90° C., whereupon, the resultant mixture containing catalyst prepared in A was added to the vial via syringe. The reaction was then allowed to proceed for 60 minutes, after which it was terminated by adding 1.0 mL acidified MeOH (10% HCL in MeOH). The resulting polymer mixture was added to 200 mL rapidly stirred acetone, which was subsequently filtered under vacuum, washed with excess acetone and dried overnight under vacuum at 60° C. to yield 0.99 g of polymer product.

EXAMPLE 23

Copolymerization of 5-butyl-2-norbornene with 5-hydroxyl-2-norbornene in the presence of allyl palladium chloride 1,3(bis(2,4,6-trimethylphenyl) imidazole-2-ylidene A. Catalyst Formation To a clean, dry 5 mL serum vial in a drybox was added 2.9 mg (6 μmol) Allyl palladium chloride 1,3(bis-(2,6-diisopropylphenyl)imidazole-2-ylidene and 0.5 mL MeCl$_2$. To a second 5 mL vial was added 2.1 mg (6 μmol) AgSbF$_6$+0.5 mL MeCl$_2$. The contents of the two vials were then combined with shaking for about 5 minutes. The resultant mixture was then filtered through a 0.2 μm Teflon® filter to afford a product yellow colored solution containing catalyst.

B. Copolymerization

To a clean, dry 50 mL serum vial under N$_2$ and equipped with a Teflon® coated stirring bar was added 0.50 g (4.56 mmol) of 5-hydroxyl-2-norbornene 1.00 g (6.66 mmol) 5-butyl-2-norbornene and 10 mL toluene. The vial was then placed in a water bath. After equilibration to 90° C., the product solution of A was then added to the vial via syringe. The reaction was then allowed to proceed for 60 minutes, after which it was terminated by adding 1.0 mL acidified MeOH (10% HCL in MeOH). The resulting mixture was then added to 200 mL rapidly stirred acetone, which was subsequently filtered under vacuum, washed with excess acetone and dried overnight under vacuum at 60° C. to yield approximately 0.01 g of polymer product.

EXAMPLE 24

Copolymerization of 5-butyl-2-norbornene with 5-hydroxyl-2-norbornene in the presence of allyl palladium chloride 1,3(bis(2,4,6-trimethylphenyl)imidazole-2-ylidene A. Catalyst Formation To a clean, dry 5 mL serum vial in a drybox was added 2.9 mg (6 µmol) Allyl palladium chloride 1,3(bis-(2,4,6-trimethylphenyl)imidazole-2-ylidene and 0.5 mL $MeCl_2$. To a second 5 mL vial was added 10.5 mg (12 µmol) dimethylanilinium tetrakis(pentafluorophenyl)borate (DANFABA)+ 0.5 mL $MeCl_2$. The contents of the two vials were then combined with shaking for about 5 minutes. The resultant mixture was then filtered through a 0.2 µm Teflon® filter to afford a product tan colored solution containing catalyst.

B. Copolymerization

To a clean, dry 50 mL serum vial under $N_2$ and equipped with a Teflon® coated stirring bar was added 0.50 g (4.56 mmol) of 5-hydroxyl-2-norbornene 1.00 g (6.66 mmol) 5-butyl-2-norbornene and 10 mL toluene. The vial was then placed in a water bath. After equilibration to 90° C., the product solution of A was then added to the vial via syringe. The contents of the vial were stirred for about 5 minutes after addition of the catalyst. The reaction was then allowed to proceed for 60 minutes, after which it was terminated by adding 1.0 mL acidified MeOH (10% HCL in MeOH). The resulting polymer mixture was then added to 200 mL rapidly stirred acetone, which was subsequently filtered under vacuum, washed with excess acetone and dried overnight under vacuum at 60° C. to yield 1.32 g of polymer product.

EXAMPLES 25

Preparation of Catalyst Solutions Used in Examples 26–33

In each of Examples 25–33, the catalyst charge was prepared using the following process, namely:

A. The following three solutions were prepared in separate 5 mL serum vials in a drybox, namely:
  i) 2.5 mg (5.1 µmol) Allyl palladium chloride 1,3(bis-(2,4,6-trimethylphenyl)imidazole-2-ylidene and 1.0 mL $MeCl_2$;
  ii) 18.0 mg (20.5 µmol) lithium tetrakis(pentafluorophenyl)borate (LiFABA)+1.0 mL $MeCl_2$; and,
  iii) 17.0 mg (20.52 mmol) dimethylanilium tetrakis(pentafluorophenyl)borate DANFABA+1.0 mL $MeCl_2$; and, B. The contents of the three 5 mL serum vials prepared in A were combined as described in Examples 26–33.

EXAMPLE 26

Homopolymerization of Norbornene with Catalyst Using Li-FABA as an Activator

To a clean, dry 15 mL serum vial under $N_2$ and equipped with a Teflon® coated stirring bar was added 1.26 g (10.6 mmol) norbornene (79 wt % in toluene) and 10 mL toluene. The vial was then placed in a Variomag® reaction block. After equilibration to 90° C., a 0.1 mL of each of solution (i) and (ii) of Example 25 (0.51 µmol and 2.0 µmol respectively) were then added to the vial via syringe. The contents of the vial were stirred for 20–30 seconds after addition of solutions (i) and (ii). The reaction was then allowed to proceed for 15 minutes, after which it was terminated by adding 1.0 mL acidified MeOH (10% HCL in MeOH). The resulting polymer mixture was then added to 200 mL rapidly stirred acetone, which was subsequently filtered under vacuum, washed with excess acetone and dried overnight under vacuum at 60° C. to yield 0.95 g polymer product.

EXAMPLE 27

Homopolymerization of Norbornene Using with Catalyst Using DANFABA as an Activator To a clean, dry 50 mL serum vial under $N_2$ and equipped with a Teflon® coated stirring bar was added 1.26 g (10.6 mmol) norbornene (79 wt % in toluene) and 10 mL toluene. The vial was then placed in a Variomag® reaction block. After equilibration to 90° C., 0.1 mL of each of solution (i) and (iii) of Example 25 (0.51 µmol and 2.0 µmol respectively) were then added to the vial via syringe. The contents of the vial were then stirred for 20–30 seconds after addition of solutions (i) and (iii). The reaction was then allowed to proceed for 15 minutes, after which it was terminated by adding 1.0 mL acidified MeOH (10% HCL in MeOH). The resulting polymer mixture was then added to 200 mL rapidly stirred acetone, which was subsequently filtered under vacuum, washed with excess acetone and dried overnight under vacuum at 60° C. to yield 0.94 g of polymer product.

EXAMPLE 28

Homopolymerization of 5-butyl-2-norbornene with a catalyst using Li-FABA as an activator To a clean, dry 50 mL serum vial under $N_2$ and equipped with a Teflon® coated stirring bar was added 1.00 g (6.7 mmol) 5-butyl-2-norbornene and 10 mL toluene. The vial was then placed in a Variomag® reaction block. After equilibration to 90° C., 0.1 mL of each of solution (i) and (ii) of Example 25 (0.51 µmol and 2.0 µmol respectively) were then added to the vial via syringe. The contents of the vial were then stirred for 20-30 seconds after addition solutions (i) and (ii). The reaction was then allowed to proceed for 15 minutes, after which it was terminated by adding 1.0 mL acidified MeOH (10% HCL in MeOH). The resulting polymer mixture was added to 200 mL rapidly stirred acetone, which was subsequently filtered under vacuum, washed with excess acetone and dried overnight under vacuum at 60° C. to yield 0.91 g of polymer product.

EXAMPLE 29

Homopolymerization of 5-butyl-2-norbornene with a catalyst using DANFABA as an activator To a clean, dry 50 mL serum vial under $N_2$ and equipped with a Teflon® coated stirring bar was added 1.00 g (6.7 mmol) 5-butyl-2-norbornene and 10 mL toluene. The vial was then placed in a Variomag® reaction block. After equilibration to 90° C., 0.1 mL of each of solution (i) and (iii) of Example 25 (0.51 µmol and 2.0 µmol respectively) were then added to the vial via syringe. The contents of the vial were then stirred for 20–30 seconds after addition of solutions (i) and (iii). The reaction was then allowed to proceed for 15 minutes, after which it was terminated by adding 1.0 mL acidified MeOH (10% HCL in MeOH). The resulting polymer mixture was added to 200 mL rapidly stirred acetone, which was subsequently filtered under vacuum, washed with excess acetone and dried overnight under vacuum at 60° C. to yield 0.93 g of polymer product.

EXAMPLE 30

Homopolymerization of Norbornene with a Catalyst Using Li-FABA as an Activator

To a clean, dry 50 mL serum vial under $N_2$ and equipped with a Teflon® coated stirring bar was added 1.26 g (10.6 mmol) norbornene and 10 mL toluene. The vial was then placed in a Variomag® reaction block. After equilibration to 90° C., 0.01 mL of each of solution (i) and (ii) of Example 25 (0.051 µmol and 0.20 µmol respectively) were then added to the vial via syringe. The contents of the vial were then stirred for 20–30 seconds after addition of solutions (i) and (ii). The reaction was then allowed to proceed for 15 minutes, after which it was terminated by adding 1.0 mL acidified MeOH (10% HCL in MeOH). The resulting polymer mixture was added to 200 mL rapidly stirred acetone, which was subsequently filtered under vacuum, washed with excess acetone and dried overnight under vacuum at 60° C. to yield 0.90 g of polymer product.

EXAMPLE 31

Homopolymerization of Norbornene with a Catalyst Using DANFABA as an Activator

To a clean, dry 50 mL serum vial under $N_2$ and equipped with a Teflon® coated stirring bar was added 1.26 g (10.6 mmol) norbornene and 10 mL toluene. The vial was then placed in a Variomag® reaction block. After equilibration to 90° C., 0.01 mL of each of solution (i) and (iii) of Example 25 (0.051 µmol and 0.20 µmol respectively) were then added to the vial via syringe. The contents of the vial were then stirred for 20–30 seconds after addition of solutions (i) and (iii). The reaction was then allowed to proceed for 15 minutes, after which it was terminated by adding 1.0 mL acidified MeOH (10% HCL in MeOH). The resulting polymer mixture was added to 200 mL rapidly stirred acetone, which was subsequently filtered under vacuum, washed with excess acetone and dried overnight under vacuum at 60° C. to yield 0.95 g of polymer product.

EXAMPLE 32

Comopolymerization of norbornene and 5-hexafluoroisopropanol-2-norbornene with a catalyst using DANFABA as an activator To a clean, dry 50 mL serum vial under $N_2$ and equipped with a Teflon® coated stirring bar was added 1.26 g (10.6 mmol) norbornene (79 wt % in toluene), 1.0 g (3.65 mmol) 5-hexafluoroisopropanol-2-norbornene and 10 mL toluene. The vial was then placed in a Variomag® reaction block. After equilibration to 90° C., 0.1 mL of each of solution (i) and (iii) of Example 25 (0.51 µmol and 2.0 µmol respectively) were then added to the vial via syringe. The contents of the vial were then stirred for 20–30 seconds after addition of solutions (i) and (iii). The reaction was then allowed to proceed for 15 minutes, after which it was terminated by adding 1.0 mL acidified MeOH (10% HCL in MeOH). The resulting polymer mixture was added to 200 mL rapidly stirred acetone, which was subsequently filtered under vacuum, washed with excess acetone and dried overnight under vacuum at 60° C. to yield 1.15 g of polymer product.

EXAMPLE 33

Copolymerization of norbornene with bicyclo[2.2.1]hept-5-ene-2-carboxylic acid methyl ester with a catalyst using DANFABA as an activator To a clean, dry 50 mL serum vial under $N_2$ and equipped with a Teflon® coated stirring bar was added 1.00 g (10.6 mmol) of norbornene (79% by wt in toluene) and 1.00 g (6.57 mmol) bicyclo[2.2.1]hept-5-ene-2-Carboxylic acid methyl ester and 10 mL toluene. The vial was then placed in a Variomag® reaction block. After equilibration to 90° C., 0.1 mL of each of solution (i) and (iii) of Example 25 (0.51 µmol and 2.0 µmol respectively) were then added to the vial via syringe. The contents of the vial were then stirred for 20–30 seconds after addition of solutions (i) and (iii). The reaction was then allowed to proceed for 15 minutes, after which it was terminated by adding 1.0 mL acidified MeOH (10% HCL in MeOH). The resulting polymer mixture was added to 200 mL rapidly stirred acetone, which was subsequently filtered under vacuum, washed with excess acetone and dried overnight under vacuum at 60° C. to yield 1.23 g of polymer product.

EXAMPLE 34

Attempted Polymerization of Norbornene Through In Situ Addition of Catalyst Precursors A. Attempted Catalyst Formation In a dry box, each of the following three solutions were produced:
(i) 1.8 mg (3.6 µmol) Pd hexafluoroacetylacetonate and 1.0 mL of toluene;
(ii) 1.4 mg (3.6 µmol) 1,3(bis-(2-6,diisopropylphenyl) imidazole-2-ylidene and 1.0 mL of toluene; and,
(iii) 2.8 mg (3.6 µmol) Dimethylanilinium tetrakis(pentafluorophenyl)borate and 1.0 mL of toluene B. Attempted Polymerization To a clean, dry 50 mL serum vial under $N_2$ and equipped with a Teflon® coated stirring bar was added 17.28 g (90 mmol) of a 48.5 mol % norbornene/toluene solution and 10 mL toluene. The vial was then placed in a water bath and allowed to equilibrate to 50° C. 0.5 mL (1.8 µmol) of each of solution (i), (ii) and (iii) of A were then added to the vial via syringe. The reaction was then allowed to proceed for 2 hours, after which it was terminated by adding 3.0 mL acidified MeOH (10% HCL in MeOH). The resulting solution was precipitated into 400 mL rapidly stirred acetone, yielding no polymer product.

What is claimed is:

1. A process for preparing a polycyclic polymer comprising contacting at least one polycycloolefin monomer with a catalyst complex having the formula:

wherein [L:MR] is a cation complex where R represents a hydrocarbyl group; M represents a metal selected from Ni, Pd and Pt; L: represents an N-heterocyclic carbene ligand; [WCA] represents a weakly coordinating anion, with the proviso that [WCA] is not $BF_4^-$; and b and d are integers representing the number of times the cation complex and the weakly coordinating anion are taken to balance the electronic charge on the overall catalyst complex.

2. The process of claim 1, wherein the N-heterocyclic carbene has a formula selected from

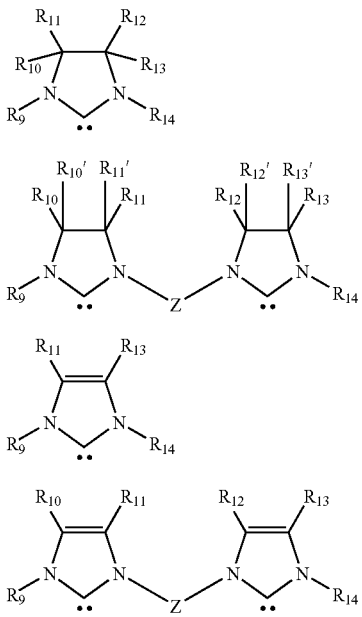

(I)
(II)
(III)
(IV)

wherein $R_9$, $R_{10}$, $R_{10}'$, $R_{11}$, $R_{11}'$, $R_{12}$, $R_{12}'$, $R_{13}$, $R_{13}'$ and $R_{14}$ are each independently hydrogen or a substituted or unsubstituted substituent selected from the group consisting of $C_1$–$C_{20}$alkyl, $C_2$–$C_{20}$alkenyl, $C_2$–$C_{20}$alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl; and wherein Z is selected from $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_2$ alkoxycarbonyl, $C_1$–$C_{20}$ alkylthio, $C_1$–$C_{20}$ alkylsulfonyl, $C_1$–$C_{20}$ alkyl sulfinyl, and silyl.

3. The process of claim 2, wherein $R_{10}$, $R_{10}'$, $R_{11}$, $R_{11}'$, $R_{12}$, $R_{12}'$ $R_{13}$ and $R_{13}'$ are each hydrogen and wherein the $R_9$ and $R_{14}$ substituents are each independently substituted or unsubstituted and are selected from phenyl, vinyl, methyl, isopropyl, tert-butyl, neopentyl and benzyl.

4. The process of claim 3, wherein the $R_9$ or $R_{14}$ substituent is substituted with at least one moiety selected from $C_1$–$C_5$ alkyl, $C_1$–$C_5$ alkoxy, phenyl and a functional group selected from hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

5. A reaction injection molding process for forming a polymeric article comprising combining at least two reactant streams to form a reactive monomer composition and transferring the reactive monomer composition to a mold where polymerization proceeds; wherein at least one of the at least two reactant streams contains a catalyst precursor [L:MRX] and a carrier; wherein at least one of the at least two reactant streams contains the salt of a weakly coordinating anion [N+WCA−] and a carrier; wherein the carrier is a solvent for the catalyst system component or a monomer or mixture of monomers to be polymerized; wherein at least one of the at least two reactant streams must comprise a polycycloolefin monomer to be polymerized; with the proviso that the catalyst precursor, [L:MRX], and the salt of the weakly coordinating anion, [N+WCA−], are not contained in the same one of the at least two reactant streams; and wherein the catalyst precursor [L:MRX] is formed by reaction of a ligand precursor and a metal complex (RMX), where the ligand precursor comprises an N-heterocyclic carbene ligand and where the metal complex (RMX) is selected from
 allylpalladium chloride dimer;
 di-μ-chlorobis[2-[(dimethylamino)methyl]phenyl-C, N] dipalladium;
 methallylnickel chloride dimer; and,
 Palladium(1+).

6. The injection molding process of claim 5, wherein the sail of the weakly coordinating anion, [N+WCA−] is selected from $AgSbF_6$, $AgPF_6$, $LiB(C_6F_5)_4$, $NaB(C_6H_3(CF_3)_2)_4$ and $C_6H_5N(CH_3)_2B(C_6F_5)_4$.

7. The injection molding process of claim 5, wherein the N-heterocyclic carbene ligand has a formula selected from

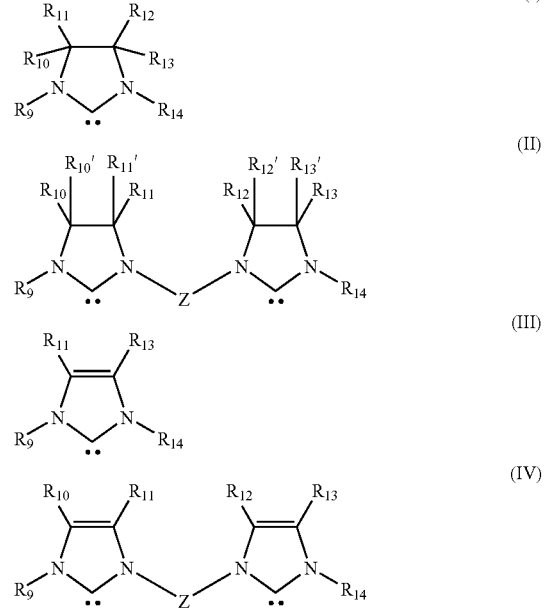

(I)
(II)
(III)
(IV)

wherein $R_9$, $R_{10}$, $R_{10}'$, $R_{11}$, $R_{,1}'$, $R_{12}$, $R_{12}'$, $R_{13}$, $R_{13}'$ and $R_{14}$ are each independent hydrogen or a substituted or unsubstituted substituent selected from the group consisting of $C_1$–$C_{20}$alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl; and wherein Z is selected from $C_1$–$C_{20}$alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl, $C_1$–$C_{20}$ alkylsulfinyl, and silyl.

8. The process of claim 7, wherein $R_{10}$, $R_{10}'$, $R_{11}$, $R_{11}'$, $R_{12}$, $R_{12}'$ $R_{13}$ and $R_{13}'$ are each hydrogen and wherein the $R_9$ and $R_{14}$ substituents are each independently substituted or unsubstituted and are selected from phenyl, vinyl, methyl, isopropyl, tert-butyl, neopentyl and benzyl.

9. The process of claim 8, wherein the $R_9$ or $R_{14}$ substituent is substituted with at least one moiety selected from $C_1$–$C_5$ alkyl, $C_1$–$C_5$ alkoxy, phenyl and a functional group selected from hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

10. The process of claim 5, wherein the number of monomer molecules used relative to the number of catalyst atoms is 500 to 2,000,000.

11. The process of claim 5, wherein the number of monomer molecules used relative to the number of catalyst atoms is 1,000 to 500,000.

12. The process of claim 5, wherein the number of monomer molecules used relative to the number of catalyst atoms is 10,000 to 250,000.

13. The process of claim 1, wherein the number of monomer molecules used relative to the number of catalyst atoms is 500 to 2,000,000.

14. The process of claim 1, wherein the number of monomer molecules used relative to the number of catalyst atoms is 1,000 to 500,000.

15. The process of claim 1, wherein the number of monomer molecules used relative to the number of catalyst atoms is 10,000 to 250,000.

16. The process of claim 1, wherein the N-heterocyclic carbene ligand has a formula selected from

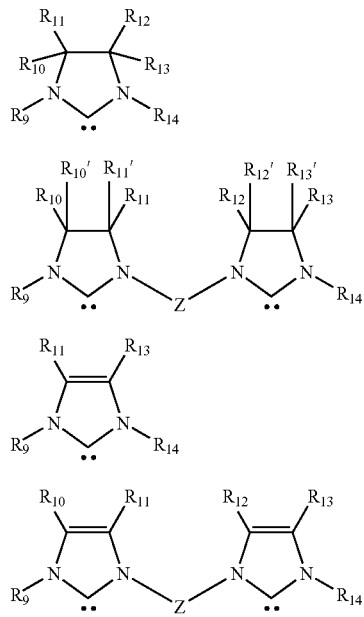

wherein at least two of $R_9$, $R_{10}$, $R_{10}'$, $R_{11}$, $R_{11}'$, $R_{12}$, $R_{12}'$ $R_{13}$, $R_{13}'$ and $R_{14}$ are linked to form a substituted or unsubstituted, saturated or unsaturated ring structure; and wherein Z is selected from $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl, $C_1$–$C_{20}$ alkylsulfinyl, and silyl.

17. The process of claim 5, wherein the N-heterocyclic carbene ligand has a formula selected from

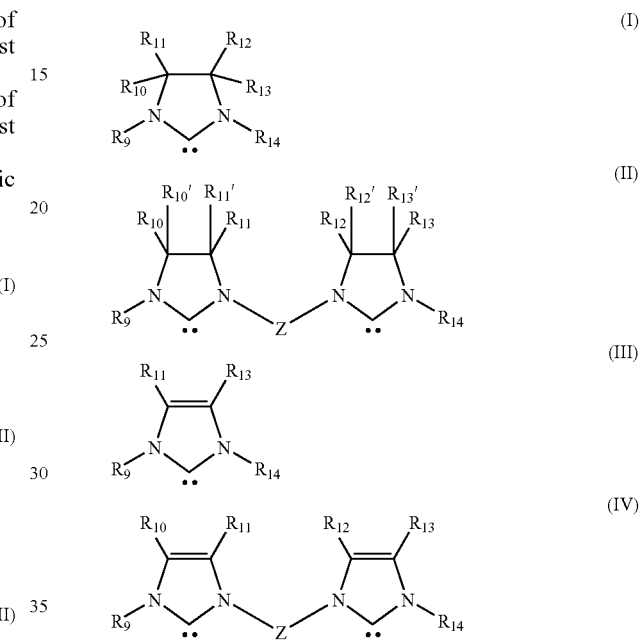

wherein at least two of $R_9$, $R_{10}$, $R_{10}'$, $R_{11}$, $R_{11}'$, $R_{12}$, $R_{12}'$ $R_{13}$, $R_{13}'$ and $R_{14}$ are linked to form a substituted or unsubstituted, saturated or unsaturated ring structure; and wherein Z is selected from $C_1$–$C_{20}$ alkyl, aryl, $C_1$–$C_{20}$ carboxylate, $C_2$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl, $C_1$–$C_{20}$ alkylsulfinyl, and silyl.

* * * * *